United States Patent [19]

Teraoka

[11] Patent Number: 5,353,543
[45] Date of Patent: Oct. 11, 1994

[54] DETERRING BIRD INTRUSION OF SPACES

[76] Inventor: Katsumi Teraoka, No. 8-19, Uyama, 3-Chome, Sumoto-shi, Hyogo-ken 656, Japan

[21] Appl. No.: 16,040

[22] Filed: Feb. 10, 1993

[51] Int. Cl.$^5$ ............................................. A01M 1/10
[52] U.S. Cl. ........................................... 43/124; 43/1; 116/22 A; 52/101
[58] Field of Search .................... 43/124, 98, 132.1, 1, 43/58, 26.1, 131; 52/101; 116/22 A; 361/232

[56] References Cited

U.S. PATENT DOCUMENTS

| | | | |
|---|---|---|---|
| 4,131,079 | 12/1978 | Rousseau | 116/22 A |
| 4,962,619 | 10/1990 | Chatten | 52/101 |
| 5,095,646 | 3/1992 | Bunkers | 43/124 |
| 5,148,621 | 9/1992 | Rosen | 43/1 |
| 5,162,014 | 11/1992 | Moore | 449/2 |
| 5,255,896 | 10/1993 | Letarte | 43/124 |

FOREIGN PATENT DOCUMENTS

| | | | |
|---|---|---|---|
| 1039263 | 10/1953 | France | 43/138 |
| 1146881 | 10/1989 | Japan . | |
| 1161054 | 6/1985 | U.S.S.R. | 116/22 A |
| 1442161 | 12/1988 | U.S.S.R. | 116/22 A |
| 1468275 | 3/1977 | United Kingdom | 116/22 A |
| 8101786 | 7/1981 | World Int. Prop. O. | 116/22 A |

*Primary Examiner*—P. Austin Bradley
*Assistant Examiner*—James Miner
*Attorney, Agent, or Firm*—George J. Brandt, Jr.; Thomas R. Morrison

[57] ABSTRACT

A device for deterring bird intrusion to a space includes permanent magnets mounted on a carrier supported at the space to be protected, the carrier being supported to be rotatable so the that by rotation of same, the bird deterring magnetic field established has intensity and/or orientation change, this with employment of a field with induction of abnormally high gauss level, creates a condition highly physiologically discomforting to a bird encountering the field and such much so that the bird leaves the space area and/or its environs.

21 Claims, 6 Drawing Sheets

FIG. 10
FIG. 11
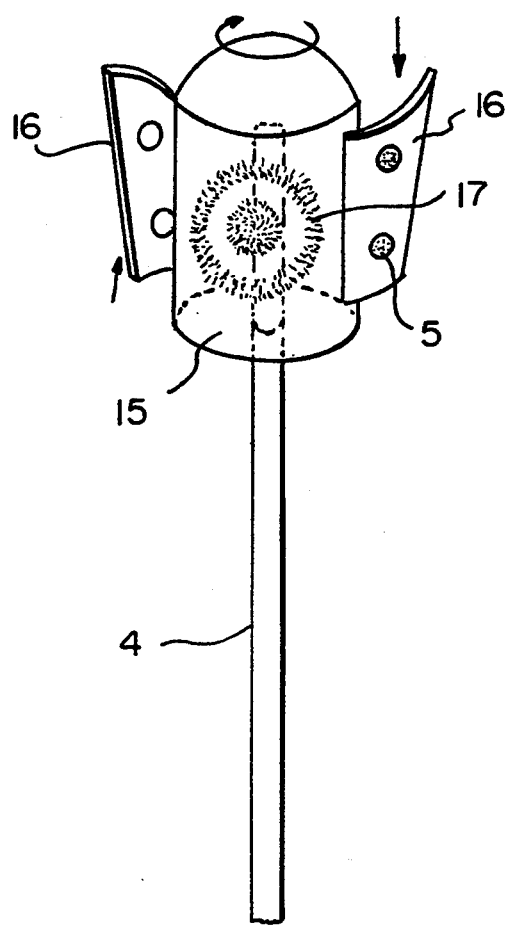
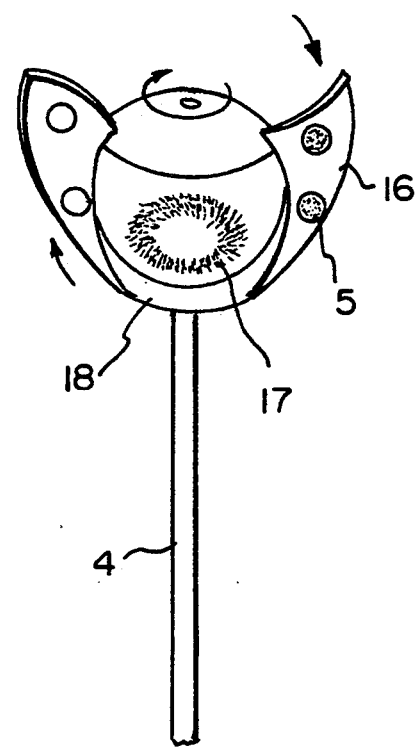

DETERRING BIRD INTRUSION OF SPACES

BACKGROUND OF THE INVENTION

The present invention relates to deterring entry of birds to spaces where their presence can be causative of damage to property or possible harm and annoyance to persons therein and, refers more particularly to a device which establishes a bird incursion deterring magnetic field at a space.

Bird presence in certain spaces such as agricultural fields, environs of dwellings, parks, commercial areas and certain industrial sites can be undesirable for numbers of reasons. For example, birds can feed on agricultural plants to the destruction or harm of plant growth. Birds at spaces where people gather such as parks, commerce centers and outdoor meeting places often are unwelcome visitors with regard to leavings which can strike people, stain automobiles and create unsightly appearance on buildings. Also, there are occasions when the presence of birds can be an annoyance to people engaged in relaxation pursuits at and about a dwelling, recreational area and the like.

Ways and means of dealing with this problem are known. In my earlier filed laid open Japanese U.M. applications 1-146881 and 4-650086, there is disclosed use of magnets to establish a magnetic field at spaces to be protected from bird intrusion, these being, for example, hemispherical magnets hung from ropes erected near spaces to be protected. These magnets are utilized in line with the understanding that magnetic field presence of a certain value can create a discomforting physiological response in birds moving into the orbit or influence of the field and such that a bird thus discomforted will fly off to escape the discomfort effect.

The magnet use described in these applications is that where numbers of the magnets are mounted at fixed locations in pattern thought to best provide field coverage for a given space. The numbers of magnets needed can be high for the purpose sought and thus can in instances represent bothersome interference with a person's quite enjoyment especially when used, for example, on a terrace or balcony of a dwelling.

It is because of disadvantages as noted above, that more effective and efficient use of these devices be provided, e.g., reduce the magnet numbers needed while enlarging the effectiveness of the magnets that are used.

OBJECTS AND SUMMARY OF THE INVENTION

Accordingly, it is an object of the invention to provide a device for deterring bird intrusion to a space which overcomes the drawbacks of the prior art.

It is a further object of the invention to provide a device for protecting spaces from bird intrusion which establishes a magnetic field zone at a space of a magnitude that creates intense physiological discomfort to a bird which enters the field and such so that the bird will fly away as readily as possible.

It is a still further object of the invention to provide a device for deterring bird intrusion to a space which employs permanent magnets of magnetite to establish a magnetic field at a field strength sufficient to effect bird discomfort reaction at the outer reaches of the field so that in most instances a bird will avoid the space.

Another object is to provide a device for deterring bird intrusion to a space in which permanent magnets which establish a deterring magnetic field are mounted on rotatable carriers so that the field intensity and/or orientation can change in correspondence to rotation, these carriers being self aligning with a prevailing wind flow wherein a gliding bird headed toward a space to be protected is present so that optimized confrontation geometry of the field for bird interdiction purpose is provided.

Briefly stated, there is provided a device for deterring bird intrusion to a space which device includes permanent magnets mounted on a carrier supported at the space to be protected, the carrier being supported to be rotatable so the that by rotation of same, the bird deterring magnetic field intensity and/or orientation established thereby at the space and which has a gauss value such as to be discomforting to birds, changes as to a given locus to maximize its effectiveness as a deterrence.

In accordance with these and other objects of the invention, there is provided a device for deterring bird intrusion of a space which device comprises a carrier with magnet means mounted on the carrier. The magnet means establish a magnetic field zone at the space and have a magnetic force magnitude which is physiologically discomforting to birds. A carrier support element is provided for supporting the carrier proximal the space, the carrier being rotatable on the support element so that magnetic field intensity and/or orientation changes in correspondence to rotation of the carrier on the support element.

In another aspect the invention provides a device for deterring bird intrusion of a space which comprises a support line extending between supports and across an entrance to the space, a plurality of permanent magnets of spherical configuration being supported from the line at spaced locations therealong. The magnets establish a magnetic field at the entrance of a density which will cause physiological discomfort to a bird entering the field.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 10 is a front view of a further embodiment according to the invention;

FIG. 11 is a front view of a still further form of the device;

DETAILED DESCRIPTION OF THE PREFERRED EMBODIMENT

The device for deterring bird intrusion to a space is intended for employment at any of locations where bird presence constitutes a potential for damage and or annoyance to crops, property or persons.

Deterrence is effected based on the knowledge that in the physiological makeup of birds there a magnetite component. If then birds be exposed to a magnetic field density of certain magnitude acting on the magnetite, an adverse or discomforting physiological response can occur in the bird. This response may include disorientation or other physiological disquietude that it is expected would drive a bird to action which would carry it away from the cause of its discomfort. The natural magnetic field density or induction of the earth and to which a bird is accustomed and unaffected by, varies depending on geographic location but generally is in a range about 0.3 to about 0.65 gauss. The magnetic field deterrence provided by the invention will be many times greater, and abnormally so as the tolerance a bird will have to a magnetic field. Field density induction value as provided by the invention will be on the order of about 1600 gauss or greater.

Figure 6:
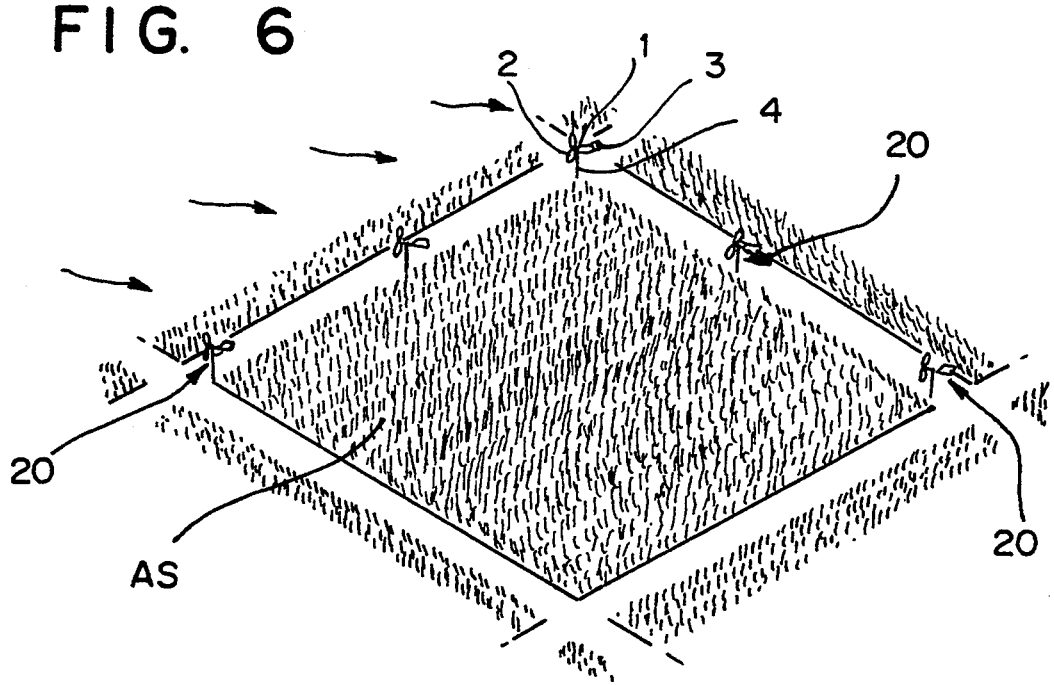
FIG. 6 is a view illustrating an example of how the device can be used to protect an agricultural space.
Figure 7:
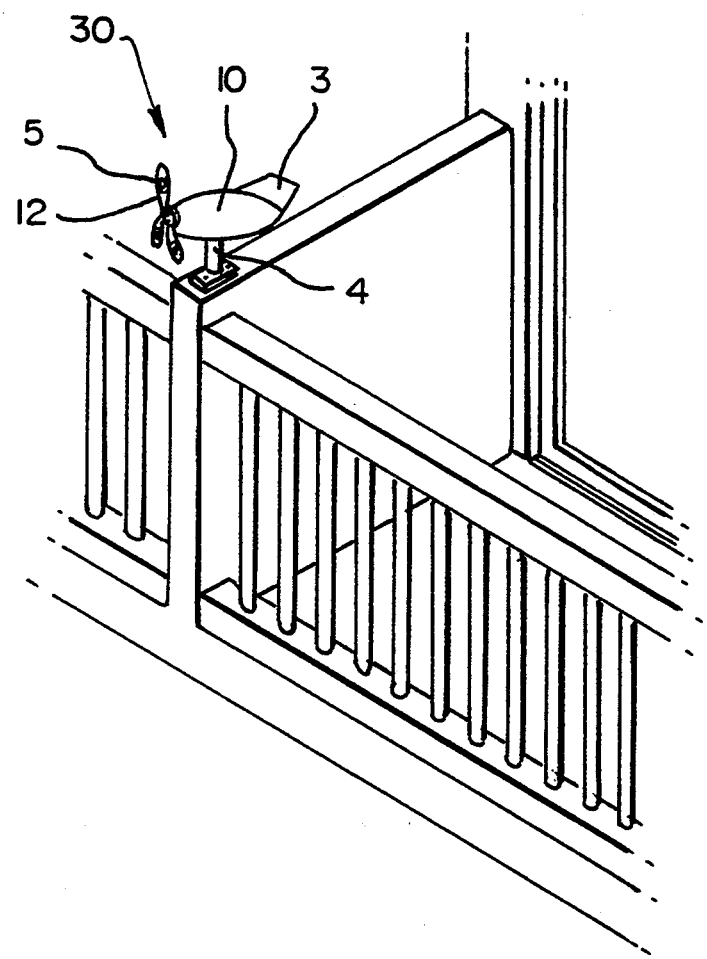
FIG. 7 is a perspective showing of another manner of use of the device.

FIGS. 6 and 7 are depictive of spaces where deterrence is desirable. In FIG. 6, an agricultural space AS is to be protected since incursion by birds can result in destruction or damage of the agricultural crops growing there. Since such type of space on a farm will be a large one, a number of deterrence devices 20 will be used to ring the space on all sides. Such embodiment of device 20 will be described later. The devices will establish a magnetic field at the space that will be discomforting to birds and such so that it will deter their entry to the space or if entry occurs, the bird will seek escape from the field influence.

FIG. 7 shows use of a device 30 in a domestic or office setting and particularly in connection with deterrence of bird (e.g., pigeon) habituation at a balcony or porch where bird annoyance could interfere with enjoyment use of that space by a homeowner.

Referring now to FIGS. 1–4 which show an embodiment of deterrence device 20, the device comprises a vertical standard 4 to the top of which is rotatably connected an elongated support member 1, this connection being at about a mid-point in the length of member 1. A carrier 2 in the form of an impeller is rotatably fixed to an end of the member 1, the carrier having two blades as at 31. A vertical tail panel 3 is fixed to an opposite end of member 1.

Carrier 2 is a mounting element for permanent magnets 5 and these can be provided, for example, as one, two or more of such on each blade 31 of the carrier. The permanent magnets 5 can of the hemispherical shape indicated in FIG. 3 or of other shape so long as the magnets provide the field density noted above. Mounting is effected in one manner, with an insert 7 that has a pin 7a passing through opening 2a in an impeller blade 31 and being received in a passage 5a in the magnet piece, the insert being widened at tile rear face of the blade and the magnet piece 5 located at the front face with the connection of these elements being by force or friction fit, or adhesive joinder. It is also possible to simply adhere the magnet directly to the face of a blade. Preferably the equator or flat face of a hemispherical magnet will be positioned immediate the blade face.

In connection with mounting of the permanent magnets 5 on a carrier blade, placement of same in manners selectively arranging the N/S poles of the magnets in various, and different orientations can be utilized to make the deterrence field more effective when the carrier is rotated. For example, in the FIG. 1 arrangement, the two magnets 5 on the top blade of carrier can be positioned with the North poles of each outermost from the blade front face, while the two magnets on the lower blade can be arranged with the South poles of each furthermost from the blade front face. Such creates significant field orientation change during rotation. Another variation could be to fix the magnets to the blades with the North poles of all outermost from the blades front faces.

Figure 1:
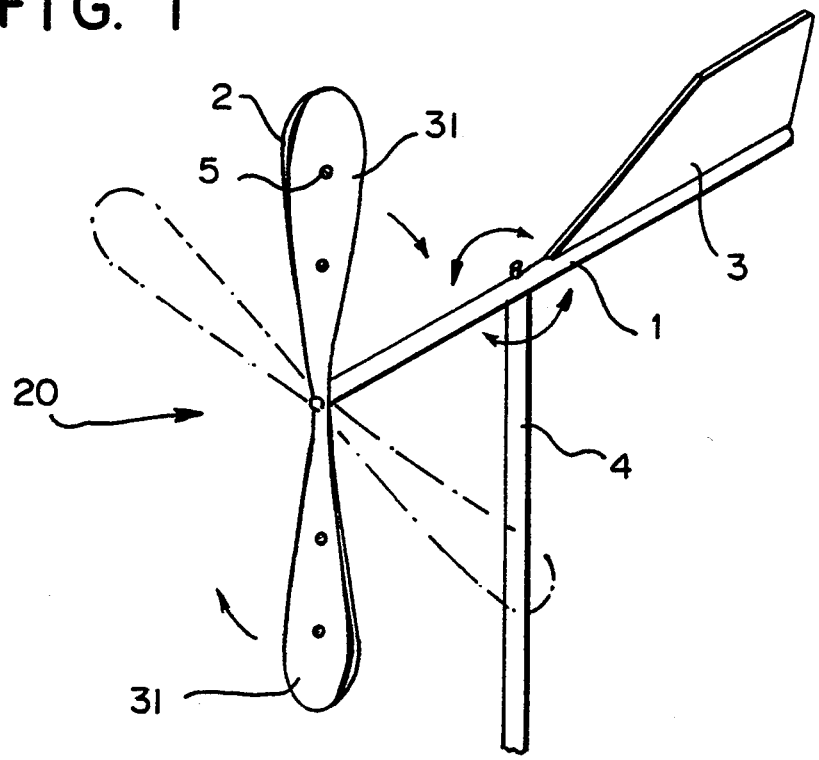
FIG. 1 is a perspective view of a device for deterring bird intrusion of a space and constructed in accordance with the invention.
Figure 2:
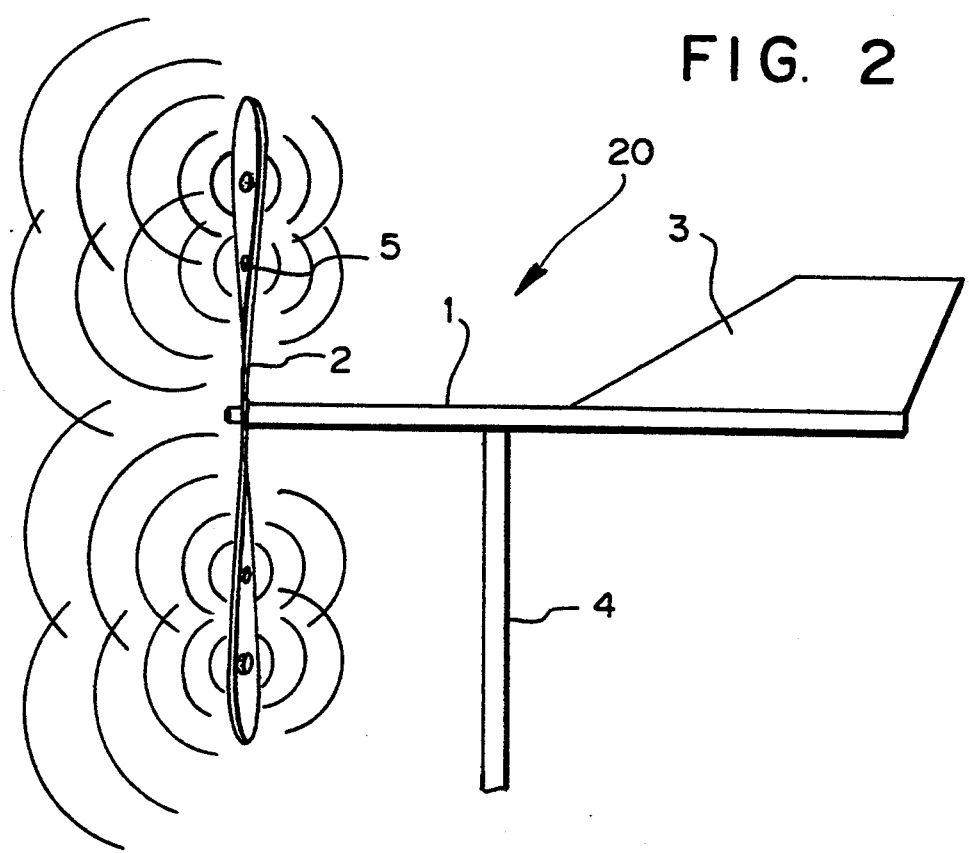
FIG. 2 is a side elevational view of the device shown in FIG. 1.
Figure 3:
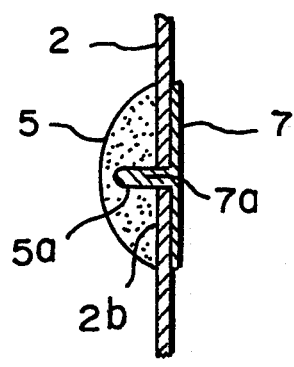
FIG. 3 is a fragmentary sectional view depicting the manner in which the magnets used in the device are mounted on a propeller.
Figure 4:
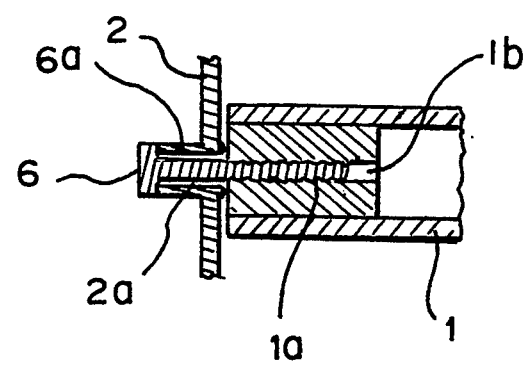
FIG. 4 is a fragmentary sectional view showing how the propeller is rotatably mounted on a main frame part of the device.

The carrier or impeller 2 is rotatably mounted to an end of the support member 1, the latter being supported at about mid-length rotatably on vertical standard 4. The rotatable mounting of the impeller to the member 1 which preferably is tubular, e.g., light gauge metal or of polyvinyl chloride pipe, is effected with a bolt 6 threaded as at 1a that passes through the impeller and is received in threaded hole 1b of a mounting block carried in member 1 as shown in FIG. 4. Impeller 2 has a hub 6a fitted with a smooth cylindrical inner surface 2a which rides (rotates) on cylindrical part of bolt 6.

The blades 31 of the carrier 2 which can have a thin aluminum coating thereon, are configured with aerodynamic character such that air flowing thereagainst will produce rotation of the impeller and the magnet about a horizontal axis defined by the member 1. During this rotation, the magnetic field describes a circular geometry creating density and/or orientation change to represent enhanced deterrence barrier.

It will be understood that with impeller rotation, a locus of the magnet field will change so that for example, the field effect with respect to a fixed or given space point or spot therein, will change as to density and/or orientation at that spot in correspondence with rotation.

The device 20 also and because member 1 is rotatable on standard 4 and is provided with a tail panel 3, will respond to prevailing wind flow direction to rotate and align the impeller in facing position to the wind direction. The result is enhanced and confronting geometry of field presence to a bird that might be approaching a space in a glide course offered by the wind.

Figure 5:
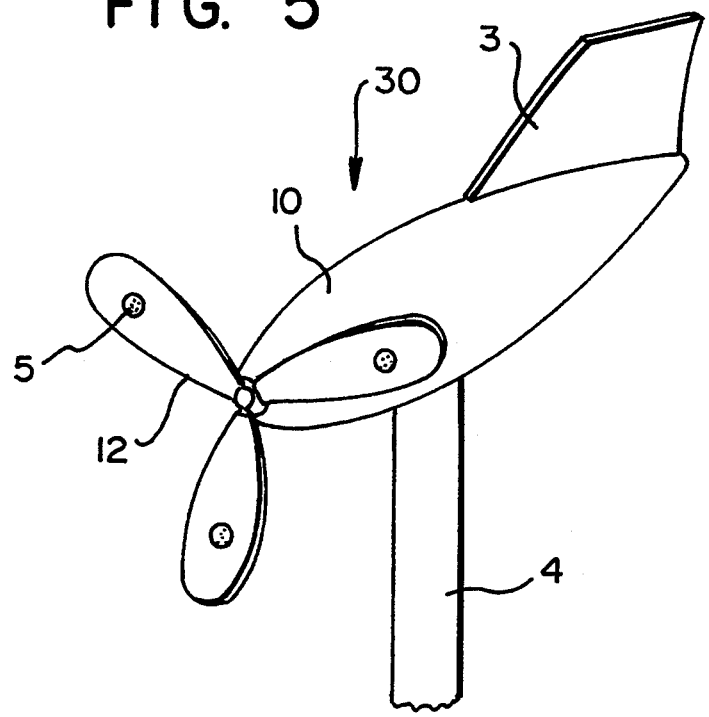
FIG. 5 is a perspective view of another embodiment of the device of the invention wherein same is made in semblance to an aircraft.

FIG. 5 depicts embodiment 30 of device in the semblance of an aircraft which has a three impeller blades 12 each carrying a permanent magnet 5, and a fuselage-shaped support member 10 which rotates on standard 4.

Figure 8A:
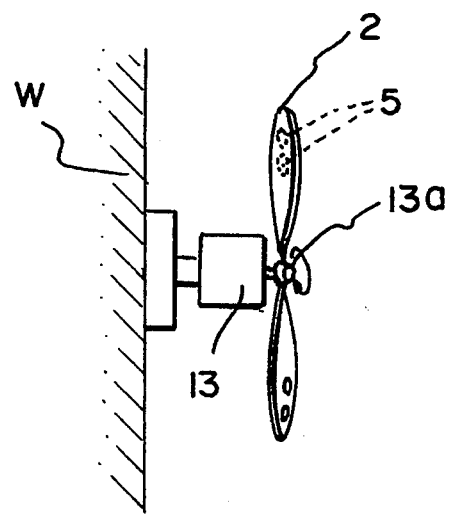
FIGS. 8A and 8B are respective side and front views of a further form of device fitted with a motor for driving the propeller, such device being particularly suited for use in areas sheltered from wind effect.
Figure 8B:
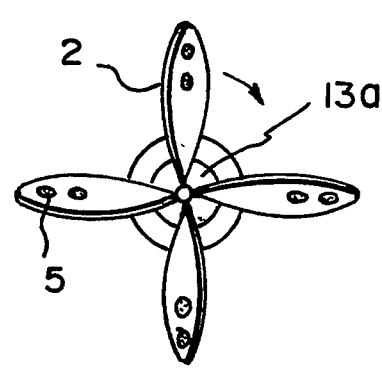

This device in addition to its utilitarian character also has some decorative value and for that reason is suited for the use shown in FIG. 7 at a space of a dwelling to be protected.

Where a space to be protected is an outdoor one, presence of wind flow as a means of inducing impeller rotation can be relied on for such purpose. On the other hand, where an indoor or sheltered space such as a warehouse, commercial plant or like can represent a food source or shelter area for a bird, wind flow may not be available and so, the impeller will be power driven. Such is shown in FIGS. 8A and 8B. The carrier 2 thereof carries four blades and it is connected to or mounted on the output shaft 13a of a motor 13. The motor will be located and mounted to a wall W or other structure part best suited to establish a magnetic field at the space to be protected and where intrusion most likely would occur.

Figure 9:
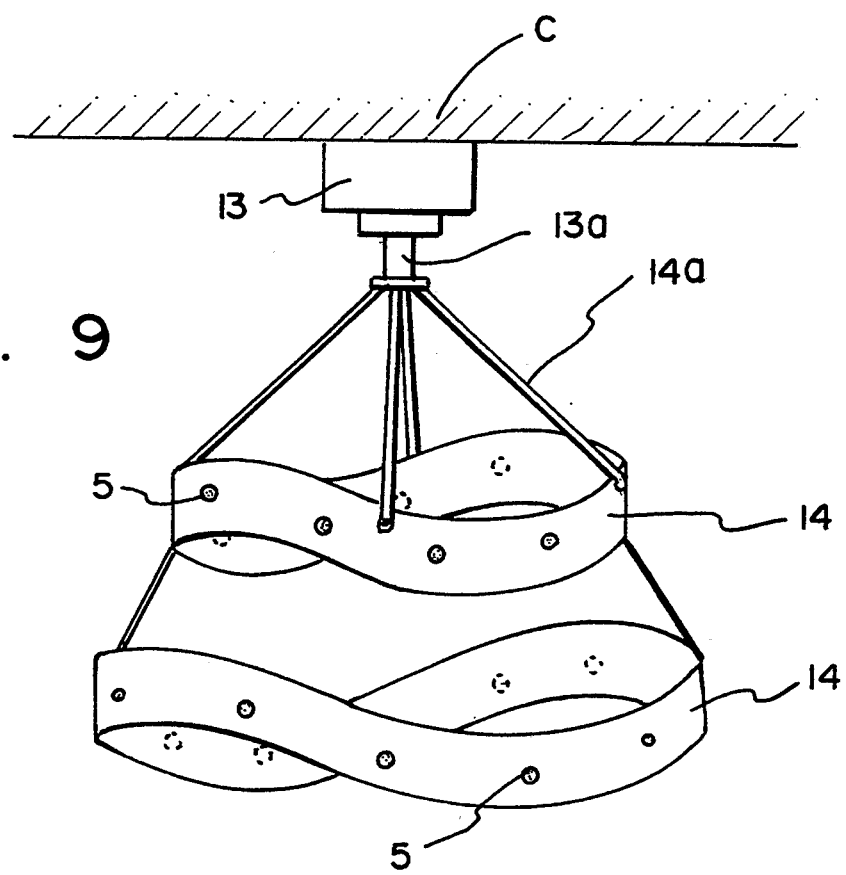
FIG. 9 is a side view of another form of the device in which a number of twisted rings are used in place of the propeller shown in the other figures as the magnets carrying element.

Another power driven embodiment of device 40 is shown in FIG. 9. This device can be supported from a ceiling C and comprises a pair of vertical spaced closed course rings 14 one of which is located above the other, the lower being hung from the upper with stringers 41 and the upper hung by means of rods 14a from a fitting at the end of the drive shaft 13a of a drive motor 13 attached to the ceiling. The rings 14 follow laterally undulating courses and a plurality of permanent magnets 5 are mounted on each ring. Further, the upper ring has a smaller diameter than the lower ring. With this arrangement, the rotation of the rings with motor 3 results in significant change in magnetic field density and/or orientation.

FIGS. 10 and 11 depict two more forms of device of air driven type and in which housings 15 (FIG. 10) and 18 (FIG. 11) are fixed rotatably to an upper end of the standard 4 Each housing is fitted wit a pair of blades 16 located at opposite sides of the housing and the blades carrying each, one or more permanent magnets. A feature of these devices is use of indicia 17 in the form of an eyeball as a further deterrent measure on the device. Housing 15 it will be noted is generally cylindrical in configuration. Housing 18 is spherical.

Figure 12:
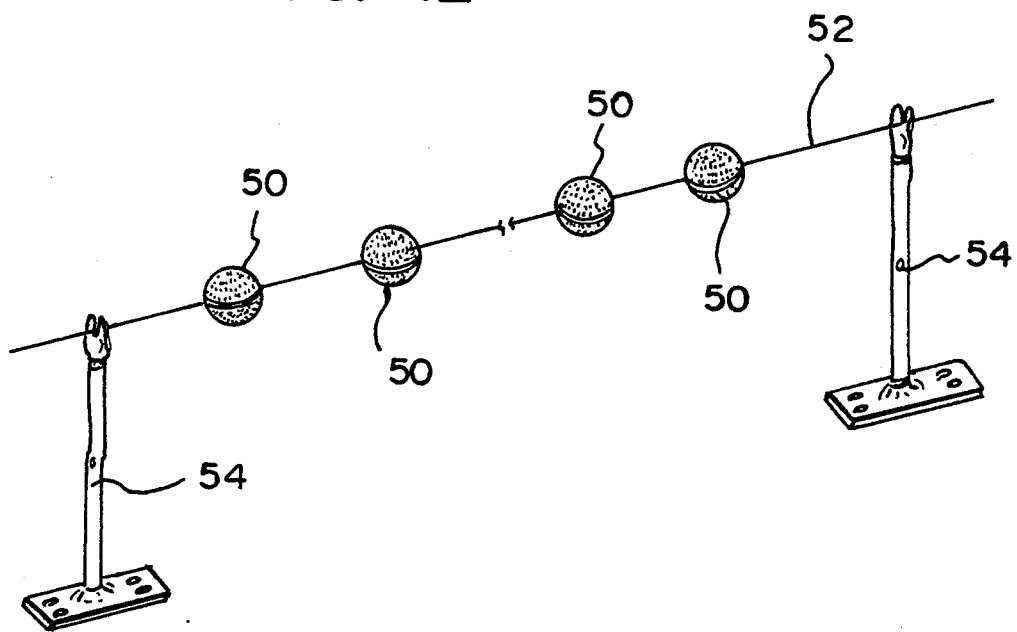
FIG. 12 is a perspective view of another embodiment of permanent magnet deterrence device wherein a plurality of spherical configured magnets are strung in a barrier course along an entry location of a space to be protected.

Referring to FIG. 12, there is shown how a string of spherical magnets 50 can be hung from a line 52 at spaced along locations between two standards 54 supporting the line. These magnets preferably are spherical in shape being made of two hemispherical pieces secured together with a disc fitting between the equators of each, the disc fitting having two axial tube parts received in bores in the magnet hemispherical pieces.

The magnets 50 will be positioned, e.g., across an entrance to a space to be protected. The magnets can be oriented, e.g., with the North poles of each alternately at the top and at the bottom of the spheres. The magnets will provide a field induction of at least about 1600 gauss. With this field strength, a curtain of magnet field is established at the space entrance to deter bird incursion. The magnets also can be oriented so that like polarity poles of the magnets lie along a common horizontal line. For example, all North poles can face upward or all can be arranged to face downward.

Figure 13:
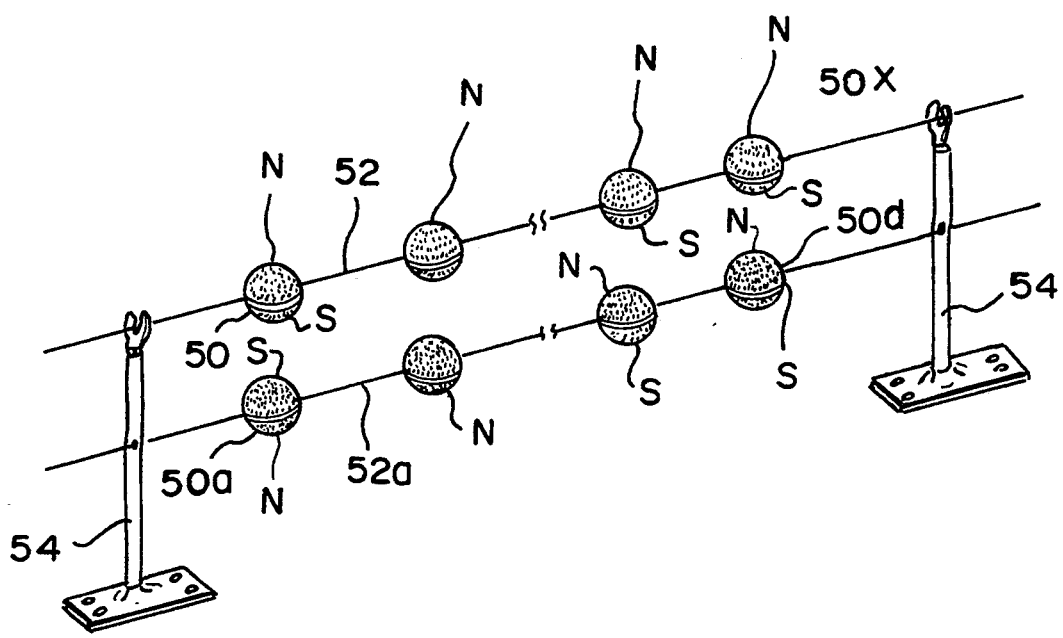
FIG. 13 is a perspective view of an embodiment like that of FIG. 12 wherein at least two lines of permanent magnets are strung in a course at the space entry location.

FIG. 13 shows a variant of the FIG. 12 device in which at least a second line of magnets 50 will be strung on a line 52a and supported between the standards 54 at a location vertically spaced from the first magnet line, the magnets of the two lines being longitudinally aligned so that a magnet 50 will be paired longitudinally with a magnet 50a and so on with the last pair being magnet and magnet 50d. The magnet orientation can be varied, e.g., the North poles of the magnets of the two pluralities of such can be arranged that these poles are remote as seen for the two left pairs of magnets in FIG. 13. In such instance, the South poles are proximal. On the other hand, and as shown with respect to the two right pairs of magnets, the proximal poles can have opposite polarity so that one is a South and the other a North pole. In that situation the two remote poles also are of opposite polarity. Still other polarity arrangements are possible.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A device for deterring bird intrusion of a space, said device comprising
   a carrier,
   magnet means mounted on the carrier, said magnet means comprising at least one permanent magnet establishing a magnetic field zone therearound and having a magnetic force magnitude which is physiologically discomforting to birds, and
   a carrier support element for supporting the carrier proximal the space, the carrier being rotatable on the support element so that when the carrier rotates on the support element, at least one of magnetic field intensity and orientation changes in correspondence with the rotation.

2. A device in accordance with claim 1 in which the permanent magnet is such as to provide magnetic field induction of at least about 1600 gauss.

3. A device in accordance with claim 2 in which the carrier is a rotary impeller.

4. A device in accordance with claim 3 which the impeller carries at least two impeller blades, there being at least one permanent magnet mounted on each blade.

5. A device in accordance with claim 4 in which the impeller blades are configured to impart rotative movement to the impeller responsive to an air flow directed against said blades.

6. A device in accordance with claim 5 in which the carrier support element is an elongated member, the carrier being rotatably mounted to a first end of the member, the member being horizontally disposed and rotatably mounted on a vertical standard, a vertical tail panel being fixed to an opposite end of the elongated member and presenting a surface against which a prevailing wind air flow can strike and thereby rotatably align the elongated member with wind flow direction.

7. A device in accordance with claim 6 in which the impeller is mounted to the elongated member such as to rotate about an axis defined by a longitudinal axis of the elongated member.

8. A device in accordance with claim 3 in which the rotary impeller is connected with a drive motor which imparts rotative movement to the impeller.

9. A device in accordance with claim 3 in which the rotary impeller includes at least two spaced apart rings which each follow a laterally undulating closed ring course, each ring carrying a plurality of permanent magnets, the rings being fixed to a support frame, the support frame being connected to a drive motor.

10. A device in accordance with claim 3 in which the rotary impeller comprises a housing fixed rotatably to a vertical support, the housing including blades extending therefrom at least each of opposite sides of the housing, the blades being configured to impart rotative movement to the housing responsive to an air flow directed against said blades.

11. A device in accordance with claim 10 in which at least two permanent magnets are carried on each blade.

12. A device in accordance with claim 10 in which the housing carries deterrence indicia on an external surface thereof.

13. A device in accordance with claim 12 in which the indicia is in the semblance of an eye ball.

14. A device in accordance with claim 1 in which the permanent magnet is made of magnetite.

15. A device in accordance with claim 1 in which the permanent magnet is of at least part spherical shape.

16. A device in accordance with claim 15 in which the permanent magnet is of hemispherical shape.

17. A device in accordance with claim 16 in which the carrier includes a face surface at which the permanent magnet is mounted thereto, an equator of said hemispherical shape confronting said face surface.

18. A device in accordance with claim 15 in which the permanent magnet is of spherical shape.

19. Device for deterring bird intrusion of a space, said device comprising
at least two vertically spaced apart generally parallel arranged support lines extending between a pair of supports and across an entrance to the space, and
a plurality of spherically configured permanent magnets carried on each support line at spaced locations therealong and such that a magnet on one support line is longitudinally aligned with a magnet on the other support line, the said permanent magnets being such as to provide magnetic field induction of at least about 1600 gauss.

20. The device of claim 19 in which the poles of magnets in one plurality which are proximal poles in the other plurality have the same polarity as the said proximal poles.

21. The device of claim 19 in which the poles of magnets in one plurality which are proximal poles in the other plurality have opposite polarity as the said proximal poles.

* * * * *